United States Patent
Choi et al.

(10) Patent No.: US 10,389,023 B2
(45) Date of Patent: Aug. 20, 2019

(54) METHOD AND DEVICE FOR TRANSMITTING AND RECEIVING SIGNAL BY USING MULTIPLE BEAMS IN WIRELESS COMMUNICATION SYSTEM

(71) Applicants: Samsung Electronics Co., Ltd, Gyeonggi-do (KR); Korea Advanced Institute of Science and Technology, Daejeon (KR)

(72) Inventors: Sang-Hyouk Choi, Chungcheongbuk-do (KR); Yong-Hoon Kim, Gyeonggi-do (KR); Hee-Seong Yang, Seoul (KR); Joo-Hwan Chun, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 436 days.

(21) Appl. No.: 15/035,201

(22) PCT Filed: Nov. 6, 2014

(86) PCT No.: PCT/KR2014/010611
§ 371 (c)(1),
(2) Date: May 6, 2016

(87) PCT Pub. No.: WO2015/069035
PCT Pub. Date: May 14, 2015

(65) Prior Publication Data
US 2016/0285164 A1 Sep. 29, 2016

(30) Foreign Application Priority Data
Nov. 6, 2013 (KR) .................. 10-2013-0134125

(51) Int. Cl.
*H01Q 3/00* (2006.01)
*H01Q 3/38* (2006.01)
(Continued)

(52) U.S. Cl.
CPC ............ *H01Q 3/38* (2013.01); *H04B 7/0408* (2013.01); *G01S 19/36* (2013.01); *H01Q 3/26* (2013.01); *H01Q 3/36* (2013.01)

(58) Field of Classification Search
CPC .. H01Q 3/03; H01Q 3/08; H01Q 3/26; H01Q 3/38; H01Q 3/36; H04B 7/0408; G01S 19/36
(Continued)

(56) References Cited

U.S. PATENT DOCUMENTS 4,042,931 A * 8/1977 Gustafsson ............... G01S 3/22
    342/427
6,087,986 A * 7/2000 Shoki ........................ G01S 3/28
    342/383
(Continued)

FOREIGN PATENT DOCUMENTS

WO    WO2013/154584 A1    10/2013

OTHER PUBLICATIONS

International Search Report dated Feb. 4, 2015 in connection with International Application No. PCT/KR2014/010611; 5 pages.
(Continued)

*Primary Examiner* — Chuong P Nguyen

(57) ABSTRACT

A method for receiving a signal by using M multiple beams in a multi-antenna system including N antenna elements, is provided in and embodiment of the present application. The method includes setting, by M beams, a beam direction for the M beams and a modulation frequency for frequency modulation of a beam response and generating the M beams according to the beam direction and the modulation fre-
(Continued)

quency set by the beams. M beam responses are generated for a receiving signal by using the generated M beams and the generated M beam responses are frequency modulated by using the modulation frequency set by the beams. The frequency-modulated M beam responses are band-pass filtered so as to separate the M beam responses and the separated M beam responses are respectively demodulated.

14 Claims, 7 Drawing Sheets

(51) Int. Cl.
*H04B 7/0408* (2017.01)
*G01S 19/36* (2010.01)
*H01Q 3/26* (2006.01)
*H01Q 3/36* (2006.01)

(58) Field of Classification Search
USPC .......................................... 342/372, 357.76
See application file for complete search history.

(56) References Cited

U.S. PATENT DOCUMENTS

| | | | |
|---|---|---|---|
| 6,167,286 A | 12/2000 | Ward et al. | |
| 6,232,920 B1* | 5/2001 | Brookner | H01Q 3/26 342/372 |
| 6,377,783 B1* | 4/2002 | Lo | H01Q 3/26 342/373 |
| 6,934,541 B2* | 8/2005 | Miyatani | H01Q 3/267 375/E1.029 |
| 6,946,993 B2* | 9/2005 | Seo | H01Q 3/24 342/374 |
| 7,057,573 B2* | 6/2006 | Ohira | H01Q 3/22 343/817 |
| 7,916,083 B2* | 3/2011 | Thiesen | H01Q 21/065 342/372 |
| 8,098,198 B2* | 1/2012 | Thiesen | H01Q 21/065 342/372 |
| 9,118,361 B2* | 8/2015 | Barker | H04B 7/0408 |
| 9,634,750 B2* | 4/2017 | Kwak | H04B 7/0617 |
| 9,762,297 B2* | 9/2017 | Lee | H04B 7/0413 |
| 2001/0038318 A1* | 11/2001 | Johnson | H03D 7/00 331/135 |
| 2004/0087294 A1* | 5/2004 | Wang | H04B 7/086 455/276.1 |
| 2005/0128141 A1* | 6/2005 | Howell | H01Q 3/26 342/372 |
| 2005/0254477 A1* | 11/2005 | Lee | H04B 7/0626 370/342 |
| 2009/0051592 A1 | 2/2009 | Lee et al. | |
| 2010/0189055 A1 | 7/2010 | Ylitalo | |
| 2012/0163510 A1* | 6/2012 | Cho | H04B 7/086 375/340 |
| 2012/0172096 A1 | 7/2012 | Samardzija et al. | |
| 2013/0051364 A1 | 2/2013 | Seol et al. | |
| 2014/0355467 A1* | 12/2014 | Seol | H04B 7/04 370/252 |
| 2016/0218779 A1* | 7/2016 | Lee | H04B 7/0413 |

OTHER PUBLICATIONS

Written Opinion of the International Searching Authority dated Feb. 4, 2015 in connection with International Application No. PCT/KR2014/010611; 4 pages.

* cited by examiner

METHOD AND DEVICE FOR TRANSMITTING AND RECEIVING SIGNAL BY USING MULTIPLE BEAMS IN WIRELESS COMMUNICATION SYSTEM

CROSS-REFERENCE TO RELATED APPLICATION(S)

The present application claims priority under 35 U.S.C. § 365 to International Patent Application No. PCT/KR2014/010611 filed Nov. 6, 2014, entitled "METHOD AND DEVICE FOR TRANSMITTING AND RECEIVING SIGNAL BY USING MULTIPLE BEAMS IN WIRELESS COMMUNICATION SYSTEM", and, through International Patent Application No. PCT/KR2014/010611, to Korean Patent Application No. 10-2013-0134125 filed Nov. 6, 2013, each of which are incorporated herein by reference into the present disclosure as if fully set forth herein.

TECHNICAL FIELD

The present disclosure relates to a method and an apparatus for transmitting and receiving signals by using multiple beams in a wireless communication system.

BACKGROUND

According to a sharp increase in traffic of high-speed data communication in a wireless or mobile communication system, research on Beam Division Multiple Access (BDMA) system has been actively performed in a next-generation communication system.

Currently, carrier frequencies, that major domestic communication operators are using, are in approximately 2 GHz band. Hardware elements forming a communication system are configured in view of a narrow band system, and it is typical that the narrow band system conventionally uses approximately ⅛ to ⅒ of the system carrier frequencies as a bandwidth. Accordingly, currently, the narrow band system is using a maximum of a bandwidth of approximately 200 MHz with a carrier frequency in the 2 GHz band as a reference. However, as mobile data traffic explosively increases due to the recent diffusion of smart phones and the like, a wide bandwidth is required. To this end, research on carrier frequencies in 28 to 30 GHz band, which is ten or more times higher than the current carrier frequency band, is being performed.

Meanwhile, reception power is proportional to the square of a wavelength, and is inversely proportional to the square of a distance. Accordingly, when a carrier frequency increases ten times, the wavelength of a carrier is reduced by ⅒, and thus the reception power is reduced by ¹⁄₁₀₀ with an identical distance as a reference. As a result, when a carrier in a high frequency band is used as described above, severe signal attenuation occurs in a receiver. In order to overcome the signal attenuation, a method is influential for reducing the size of a base station cell, and generating a beam maximizing a Signal-to-Noise Ratio (SNR) and performing communication when a signal is transmitted/received between a base station and a user equipment. Accordingly, the user equipment needs to find a base station maximizing an SNR among multiple base stations which are denser than in an existing communication system, needs to find a beam maximizing a SNR with the relevant base station, and needs to communicate with the base station by using the beam. These situations become a basic premise in the BDMA system.

SUMMARY

It is necessary to efficiently transmit/receive a beam in a wireless communication system transmitting and receiving signals by using multiple beams, including the above-described BDMA system.

Therefore, an embodiment of the present disclosure provides a method and an apparatus for transmitting and receiving signals by using multiple beams in a wireless communication system.

An embodiment of the present disclosure provides a method and an apparatus for generating or receiving a plurality of multi-beams by using one beamformer in an antenna system supporting one multi-beam.

An embodiment of the present disclosure provides an antenna apparatus and an operating method thereof which are capable of simultaneously acquiring multiple beam responses by using one receiver in a multi-antenna system using an array antenna element.

In accordance with an aspect of the present disclosure, a method for receiving a signal by using an M number of multiple beams in a multi-antenna system including an N number of antenna elements is provided. The method includes setting beam directions of the M number of beams and modulation frequencies for frequency-modulating beam responses of the M number of beams, according to the M number of respective beams; generating the M number of beams according to the beam directions and the modulation frequencies which are set according to the M number of respective beams; generating an M number of beam responses to the received signal by using the M number of generated beams; frequency-modulating the M number of generated beam responses by using the modulation frequencies which are set according to the M number of respective beams; band-pass filtering the M number of frequency-modulated beam responses and separating the M number of beam responses from each other; and demodulating each of the M number of separated beam responses.

The setting of the beam directions of the M number of beams and the modulation frequencies for frequency-modulating the beam responses of the M number of beams includes: determining pairs of beam directions and modulation frequencies which cause a sum of values obtained by multiplying the M number of respective beams, which are set for a k-th antenna element, by the modulation frequencies, which are set according to the M number of respective beams, to become one of complex gain values capable of being expressed by a Transmit/Receive Module (TRM) connected to the k-th antenna element; and selecting the beam directions and the modulation frequencies, which are set according to the M number of respective beams, from among the determined pairs of the beam directions and the modulation frequencies, and the determining of the pairs of the beam directions and the modulation frequencies includes: converting a sum of values obtained by multiplying the M number of respective beams by the modulation frequencies, which are set according to the M number of respective beams, into a complex number having a magnitude and a phase; and determining the pairs of the beam directions and the modulation frequencies which cause the converted phase to become a multiple of a phase value capable of being expressed by a phase shifter within the TRM and cause the converted magnitude to become a multiple of a magnitude value capable of being expressed by an attenuator within the TRM.

The phase value capable of being expressed by the phase shifter corresponds to $2\pi \times (1/2)^{Np}$, wherein Np represents the number of bits of the phase shifter, and the phase value capable of being expressed by the attenuator corresponds to $2\pi \times (1/2)^{Na}$, wherein Na represents the number of bits of the phase shifter.

Also, the method further includes storing the determined pairs of the beam directions and the modulation frequencies in a table form.

The sum of the values obtained by multiplying the M number of respective beams by the modulation frequencies, which are set according to the M number of respective beams, corresponds to a value changing according to time.

In accordance with another aspect of the present disclosure, an apparatus for receiving a signal by using an M number of multiple beams in a multi-antenna system including an N number of antenna elements is provided. The apparatus includes a beam control unit that sets beam directions of the M number of beams and modulation frequencies for frequency-modulating beam responses of the M number of beams, according to the M number of respective beams; a beamformer that generates the M number of beams according to the beam directions and the modulation frequencies which are set according to the M number of respective beams; a reception unit that generates an M number of beam responses to the received signal by using the M number of generated beams; a digital signal processing unit that frequency-modulates the M number of generated beam responses by using the modulation frequencies which are set according to the M number of respective beams, and band-pass filters the M number of frequency-modulated beam responses and separates the M number of beam responses from each other; and a demodulation unit that demodulates each of the M number of separated beam responses.

DETAILED DESCRIPTION

Figure 1:
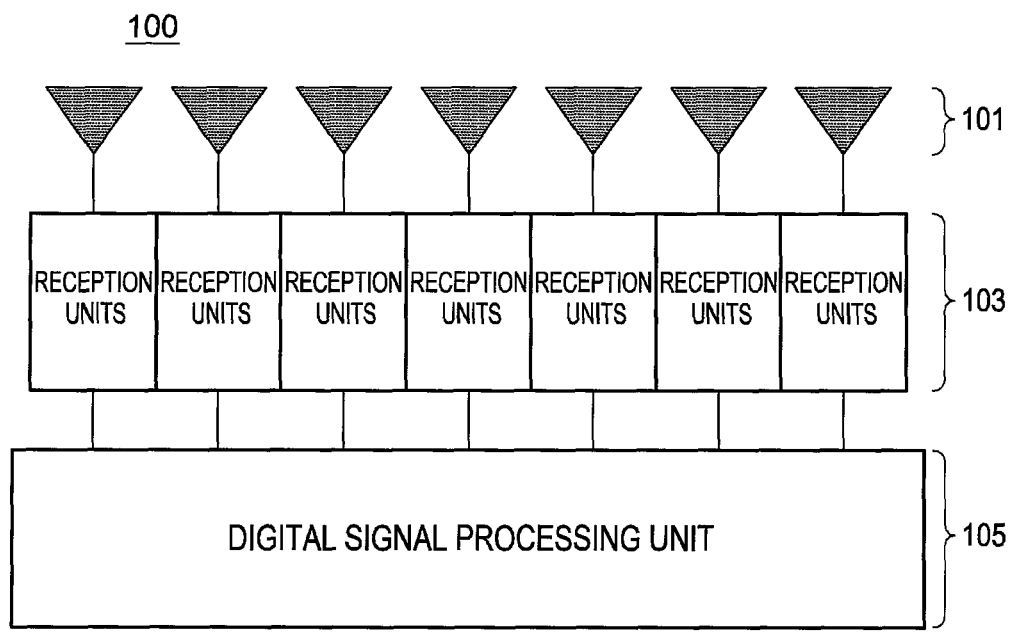
FIG. 1 is a view for explaining a receiver typically used to select a beam.

Hereinafter, a specific embodiment of the present disclosure which may be carried out will be exemplarily described in detail with reference to the accompanying drawings. The embodiments will be sufficiently described in detail such that those skilled in the art may carry out the present disclosure. It should be understood that although various embodiments of the present disclosure are different from each other, they need not be mutually exclusive. For example, with relation to an embodiment, specific forms, structures, and characteristics described herein may be implemented through another embodiment without departing from the spirit and scope of the present disclosure. Further, a location or an arrangement of an individual structural element in each disclosed embodiment may be changed without departing from the spirit and scope of the present disclosure. Accordingly, the detailed descriptions which will be given below are not intended to be restrictive, and the scope of the present disclosure, if properly described, should be limited only by the accompanying claims and equivalents thereof. Similar reference numerals shown in the drawings denote members performing an identical or similar function in several aspects.

Hereinafter, exemplary embodiments of the present disclosure will be described in detail with reference to the accompanying drawings in order to enable those having ordinary knowledge in the technical field, to which the present disclosure pertains, to easily practice the present disclosure.

A basic concept of embodiments of the present disclosure proposes a method and an apparatus capable of simultaneously acquiring responses of beams, which are received from multiple directions, by using one beamformer in a multi-antenna system including multiple antenna elements. Hereinafter, embodiments of the present disclosure will be described in detail.

FIG. 1 is a view for explaining a receiver typically used to select a beam.

In FIG. 1, consideration is given to a case where array antennas 101 are conventionally used. In a receiver 100 in FIG. 1, reception units 103 are connected to the respective array antennas 101, and response values of all of the array antennas are digitized by a digital signal processing unit 105.

However, costs are very high when reception units 103 are connected to all the respective array antennas. Accordingly, actually, a "sub-array" antenna configured to connect one reception unit to multiple array antenna elements is widely used. Conventionally, when multiple antennas are used, a response of an array antenna may be acquired through various algorithms, such as adaptive processing and the like. However, a low-priced receiver including one reception unit cannot perform adaptive processing.

As the alternative, in Wireless Gigabit Alliance (WiGiG) and 802.15.3c which are standards for the next-generation Wireless Personal Area Networks (WPAN), a transmission/reception beam is found by using a simple scheme referred to as "beam sweeping." However, the beam sweeping scheme has disadvantages, such as much time required to search for a beam and the like.

Figure 2:
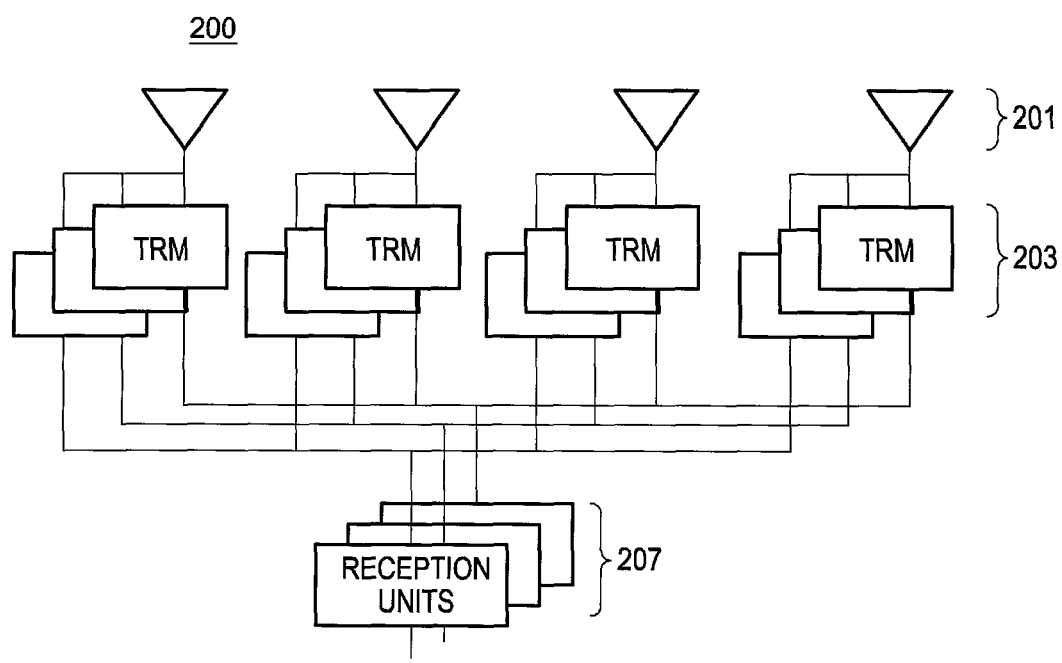
FIG. 2 is a view for explaining a typical receiver (indicated by reference numeral 200) for simultaneously acquiring multiple beam responses.

FIG. 2 is a view for explaining a typical receiver 200 for simultaneously acquiring multiple beam responses.

A most basic scheme for acquiring multiple beam responses has a structure for generating beams by using as many Transmit/Receive Modules (TRMs) 203 as the number of beams, connecting the generated beams to an array antenna 201 and steering a beam of an antenna element according to a beam direction which is set according to each of the TRMs 203, and connecting reception units 207 to the respective rear ends of the TRMs 203 and acquiring responses of the beams. Conventionally, the system illustrated in FIG. 2 is referred to as a "beam space array antenna system."

Figure 3:
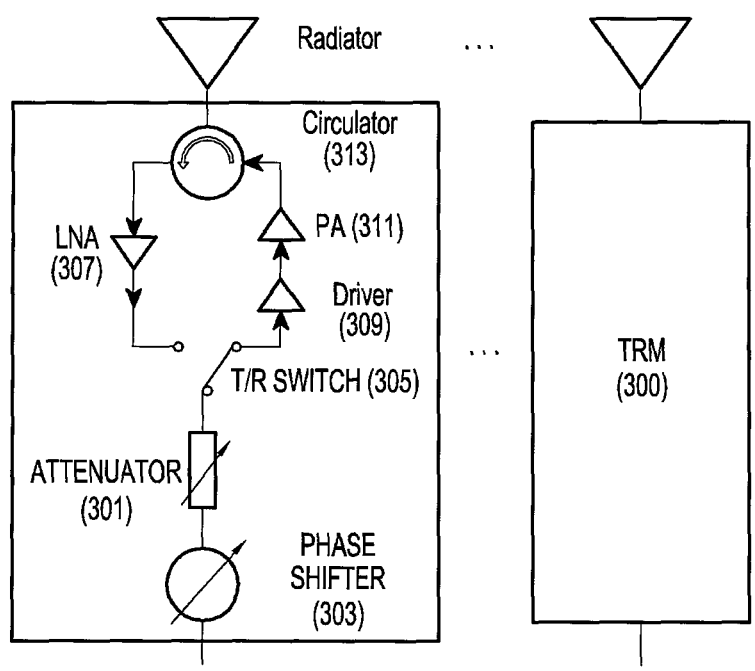
FIG. 3 is a view for explaining a configuration of a TRM in FIG. 2.

FIG. 3 is a view for explaining a configuration of a TRM in FIG. 2.

A TRM 300 includes a phase shifter 303 and an attenuator 301, and the phase shifter 303 and the attenuator 301 perform a function of multiplying each array antenna element by a complex beam gain for steering a beam.

Specifically, the attenuator 301 takes charge of the magnitude of a complex gain, and serves to change the magnitude of the complex gain to a magnitude corresponding to a set complex gain. The phase shifter 303 takes charge of the phase of a set complex gain, and serves to change the phase of the complex gain to a phase corresponding to the set complex gain. Also, the TRM 300 includes a transmission function unit, that includes a switch 305 for performing a switching during transmission/reception of a signal, a driver 309, and a power amplifier 311, a Low-Noise Amplifier (LNA) 307 for receiving a signal, and a circulator 313 for connecting each of a transmission-side signal chain and a reception-side signal chain to an antenna during transmission/reception of a signal.

Figure 4:
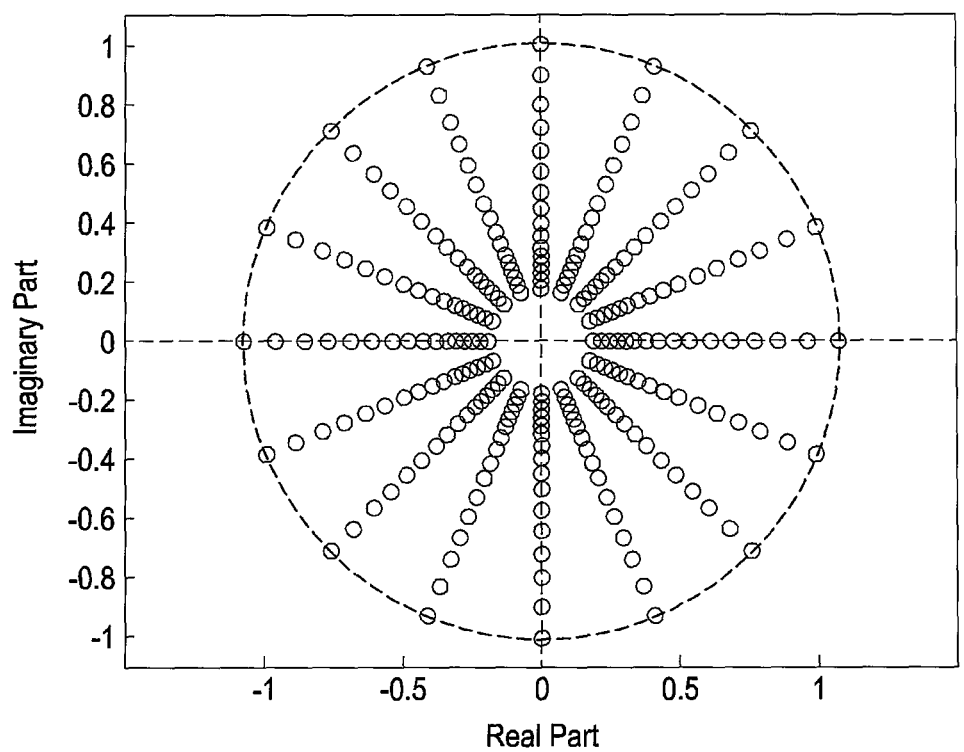
FIG. 4 is a view illustrating values of a complex gain which may be generated by using a phase shifter and an attenuator in the TRM in FIG. 3.

FIG. 4 is a view illustrating values of a complex gain which may be generated by using a phase shifter and an attenuator in the TRM in FIG. 3.

In FIG. 4, small circles represent complex gain values that a TRM may generate by using a phase shifter and an attenuator. In this regard, as illustrated in FIG. 4, the number of complex gain values, which may be obtained by using the phase shifter and the attenuator, is limited. A reason why the complex gain is limited as described above is as follows.

Each of the phase shifter 303 and the attenuator 301 is designed to have a particular bit. For example, in the case of an attenuator designed to have N bits, it is typical that 0.5 dB is usually assigned to a Least Significant Bit (LSB), following bits are designed to be capable of causing attenuations of $2^0$, $2^1$, $2^2$, ..., $2^{N-2}$ dB, and thereby the attenuator is designed to cause an attenuation up to a maximum of $2^{N-1}$−0.5 dB.

Also, in the case of a phase shifter designed to have N bits, a minimum phase that the phase shifter may express is <2π×(1/N)>, and accordingly, the phase shifter is designed to be capable of increasing a phase by an integer multiple of the minimum phase of <2π×(1/N)>. Therefore, the number of values of a complex gain that the phase shifter 303 and the attenuator 301 may generate is limited as illustrated in FIG. 4.

Meanwhile, there is considerable difficulty in achieving implementation in a case where a signal in a 30 GHz band is desired to be detected by using the beam space array antenna illustrated in FIG. 2. Specifically, when a carrier frequency becomes 30 GHz, a wavelength of a signal becomes 1 cm (0.39 in). When an array antenna is designed, typically, an interval between array elements is determined as half the wavelength. In this case, the interval between array elements becomes 5 mm (0.2 in). In order to connect multiple array antenna elements disposed at intervals of 5 mm (0.2 in), conducting wires connected to the respective array elements need to be divided again by the number of beams, and the conducting wires divided by the number of beams need to be connected to the respective TRMs. In this regard, in order to minimize a correlation or coupling between beam responses of the respective TRMs, it is essential to ensure a space between the TRMs.

However, it is very difficult to connect multiple TRMs to the array elements, which are disposed at intervals of 5 mm (0.2 in), in view of a coupling from the array elements. Also, even when it is possible to avoid a coupling between the respective conducting wires and provide the array antenna with a wide space, a problem occurs in that the size of a user equipment becomes larger.

Also, the problem of implementation costs occurs even when consideration is given to a case where the user equipment uses a beam sweeping technique by using only one TRM and one reception unit and only a base station measures multiple beam responses in a beam space array structure. In the case of a base station, an array antenna of at least 1 m (39.37 in) is expected to be used, and 200 array elements are disposed per 1 m (39.37 in). Accordingly, in the case of a scheme for connecting reception units to respective array elements, the number of required reception units is equal to 200, and thus implementation costs are significant. Also, in the case of a beam space, hundreds of array elements need to be connected again to thousands of TRMs and the hundreds of array elements connected to the thousands of TRMs need to be connected to the respective reception units. Accordingly, there occur various problems, such as the problem of personnel expenses at the time of manufacturing facilities, a coupling problem between conducting wires, an increase in costs caused by the use of multiple reception units, and the like.

An embodiment of the present disclosure operates a beam in a scheme different from an existing scheme in a communication system using multiple beams.

In the existing scheme, when a signal is transmitted or received in a communication system using multiple beams, a complex gain value determined to be optimal for each antenna is previously calculated with respect to an aimed direction or an optional channel and the calculated complex gain value is used, or a complex gain value is calculated through adaptive processing and then, the calculated complex gain value is used. Also, since a progress direction or a channel of a signal does not change during the transmission or reception of the signal, it is typical that a fixed beam is conventionally used without changing a complex gain value for forming a beam.

In contrast, in an embodiment of the present disclosure, in order to generate or receive multiple beams by using one reception unit, use is made of a time varying beam weight scheme in which a complex gain value changes according to time differently from an existing scheme for using a beam having a complex gain value fixed according to time. Specifically, a complex gain value for a beam is changed during transmission/reception of a signal, and thereby, a result value, which is output through one reception unit after a response for each beam frequency-modulated, is not a value obtained by simply adding up responses of the respective beams, but is subjected to being shifted to a particular frequency band, so as to enable the responses of the respective beams to be separated from each other during a process for digital processing of a signal.

To this end, in an embodiment of the present disclosure, in order to simultaneously generate an M number of beams, the sum of values, which are obtained by multiplying an M number of beams of an optional array antenna element by respective modulation frequencies, is converted into a form of a complex number expressed by a magnitude and a phase, and a determination is made of pairs of beam directions and modulation frequencies which cause a complex gain value to become one of the complex gain values which may be obtained by the phase shifter and the attenuator illustrated in FIG. 4. Specifically, a "complex gain value condition" is set for causing the sum of the values, which are obtained by multiplying the M number of beams by the respective modulation frequencies, to become a complex gain value illustrated in FIG. 4. The complex gain value condition may include a "phase condition" and a "magnitude condition." When the sum of the values obtained by multiplying the M number of beams by the respective modulation frequencies is expressed by a magnitude and a phase, the phase condition is that the magnitude and the phase satisfy multiples of a magnitude and a phase that the complex gain values illustrated in FIG. 4 may express.

A linear equation may be obtained from the phase condition and the magnitude condition. When an optional value is substituted into a setting parameter included in the linear equation, multiple {beam direction, modulation frequency} values satisfying the complex gain value condition may be calculated.

One pair is selected from among the pairs of {beam directions, modulation frequencies} determined as described above, and an effect of simultaneously generating multiple beams by using one beamformer may be produced when a phase of the phase shifter and a level of the attenuator are adjusted according to the selected {beam direction, modulation frequency}. Also, the selected beam direction and modulation frequency are fixed after being selected, but in an embodiment of the present disclosure, a complex gain value of a TRM connected to an optional antenna element is set to change according to time, and accordingly, the phase of the phase shifter and the level of the attenuator of the TRM are also continuously adjusted according to time. In this regard, the complex gain value of the TRM which changes according to time may be within the range of complex gain values illustrated in FIG. 4.

Meanwhile, an embodiment of the present disclosure considers a communication system using a band-limited signal as in the case of Orthogonal Frequency Division Multiplexing (OFDM). In an embodiment of the present disclosure, an operation of a transmitter is reciprocal to that of a receiver, and hereinafter, the description will focus on an operation of the receiver for convenience of description.

Before the description is made of an embodiment of the present disclosure, the terms used in this specification will be defined.

The term "beam" refers to multiplying each antenna element by the value of a complex gain in order to emit a signal so as to maximize power of the transmitted signal in a particular direction or in a subspace of a particular channel or in order to receive a signal in such a manner as to maximize power of the received signal arriving from the particular direction or at the subspace of the particular channel, in a communication system having multiple antennas elements.

The term "beam response" refers to the value of a weighted sum of reception signals received by multiple antennas elements calculated by using beam weights which are particularly set.

The term "one beamformer" refers to a configuration in which one TRM is connected to each of multiple (N) antenna elements and the TRMs share one reception unit.

An embodiment of the present disclosure is for generating multiple (M) beams by using one beamformer in a reception system including the multiple (N) antenna elements. A transmission system according to an embodiment of the present disclosure may also be implemented to correspond to the reception system. When compared with such an embodiment of the present disclosure, the existing reception system explained in FIG. 2 differs from an embodiment of the present disclosure in that the existing reception system forms three beams by using three beamformers.

Hereinafter, when consideration is given to a case where multiple TRMs are connected to one antenna element and multiple TRMs share one reception unit, it will be described that the reception unit has difficulty in separating multiple beam responses from each other.

Figure 5:
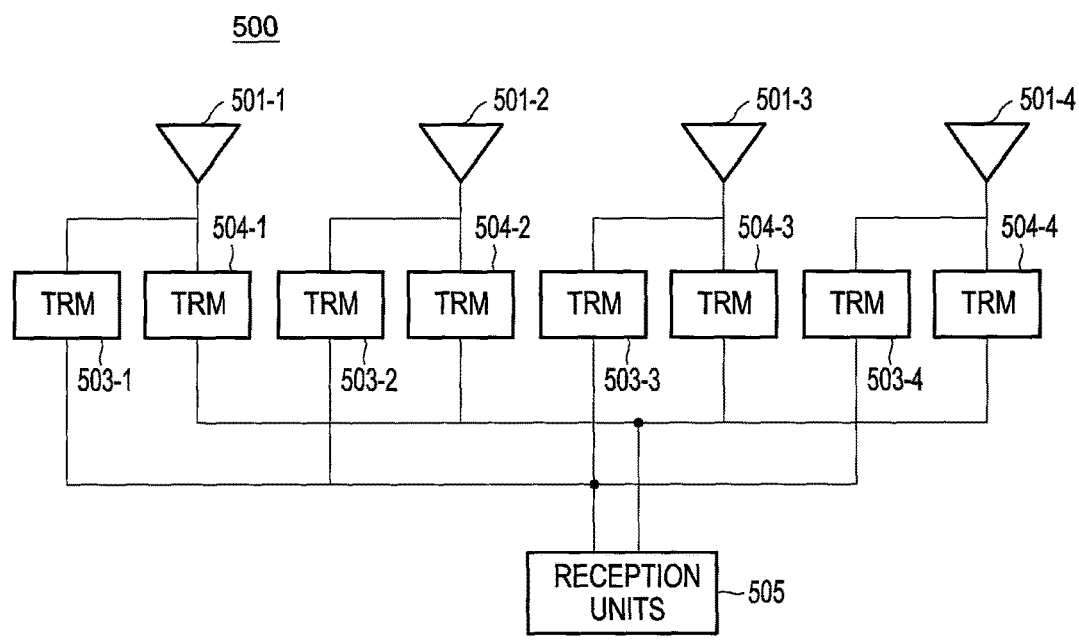
FIG. 5 is a view for explaining the reception of a signal in a case where consideration is given to a case where multiple TRMs are connected to one antenna element and multiple TRMs share one reception unit.

FIG. 5 is a view for explaining the reception of a signal in a case where consideration is given to a case where multiple TRMs are connected to one antenna element and multiple TRMs share one reception unit.

In FIG. 5, consideration is given to a case where one receiver 500 includes four antenna elements 501-1 to 501-4 and attempts to reconstruct a received signal to its original state by using two beams (a first beam and a second beam). Also, two TRMs are connected to each antenna element, and a received signal which is input to each antenna element may be multiplied by a beam weight of the first beam and a weight of the second beam. For example, the two TRMs 503-1 and 504-1 are connected to the antenna element 501-1. The TRMs are connected to the respective other antenna elements in an identical manner. Also, the respective antenna elements 501-1 to 501-4 may be multiplied by four beam weights of the first beam by using the four TRMs 503-1 to 503-4, and the respective antenna elements 501-1 to 501-4 may be multiplied by four beam weights of the second beam by using the four TRMs 504-1 to 504-4. Meanwhile, consideration is made to a case where the four TRMs 503-1 to 503-4 for the first beam and the four TRMs 504-1 to 504-4 for the second beam share the one reception unit 505.

In this consideration, a description is made of a situation in which a signal is received by the receiver 500.

First, in FIG. 5, when consideration is given to a case where $$\begin{bmatrix} 1 \\ 2 \\ 3 \\ 4 \end{bmatrix}$$

representing received signal values are input in order through the four antenna elements 501-1 to 501-4, if the first beam is configured to have $$\begin{bmatrix} e^{j\pi} \\ e^{j2\pi} \\ e^{j\pi} \\ e^{j2\pi} \end{bmatrix}$$

representing four beam weights (i.e., complex gain values), a beam response of $$\begin{bmatrix} e^{j\pi} \\ e^{j2\pi} \\ e^{j\pi} \\ e^{j2\pi} \end{bmatrix}$$

representing the first beam is expressed by Equation 1 below.

$1e^{j\pi}+2e^{j2\pi}+3e^{j\pi}+4e^{j2\pi}=-1+2-3+4=2$  Equation 1

Also, when weights of the second beam are set to $$\begin{bmatrix} e^{j\pi} \\ e^{j2\pi} \\ e^{j\pi} \\ e^{j2\pi} \end{bmatrix},$$

a beam response value of the second beam is expressed by Equation 2 below.

$$1e^{j2\pi}+2e^{j\pi}+3e^{j2\pi}+4e^{j\pi}=-1-2+3-4=-2 \quad \text{Equation 2}$$

In this regard, since FIG. 5 illustrates the configuration in which the two beamformers share one reception unit, an overall beam response of the reception unit 505 may become the sum of the first beam response and the second beam response. For reference, as described above, the one beamformer is defined as the configuration in which one TRM is connected to each of multiple (N) antenna elements and the TRMs share one reception unit. Accordingly, in FIG. 5, the four TRMs 503-1 to 503-4 and the reception unit 505 for the first beam construct one beamformer, and the four TRMs 504-1 to 504-4 for the second beam construct the other beamformer. However, in FIG. 5, the one reception unit 505 is shared by the two beamformers, and thus, a final output acquired by the reception unit 505 may be zero which is a value obtained by adding up the beam response value (+2) of the first beam and the beam response value (−2) of the second beam.

In this regard, when a final output from the reception unit 505 becomes equal to zero, it is impossible to recognize the value of a signal received through the four antenna elements 501-1 to 501-4. This is because the number of cases where the sum of two numbers becomes equal to zero is innumerable. Accordingly, in this case, it may be difficult to reconstruct the received signal to its original state.

However, when optional signal modulations are performed on the two respective beam responses and the signal-modulated beam response values are added together, two beam responses may be reconstructed from the sum of the two signal-modulated signals.

However, a received signal, which is input to each of the four antenna elements 501-1 to 501-4, is a signal modulated by the transmitter. Meanwhile, an analog beamformer includes analog components, and thus, there is a limit on a method for signal modulation which is capable of using the analog components. However, as described above, an embodiment of the present disclosure considers signal modulation using OFDM during transmission/reception of a signal, and OFDM modulation has the characteristic of a band-limited signal. For reference, a band-limited signal may be signal-modulated by using only an analog component. Accordingly, in an embodiment of the present disclosure, when signal modulation is performed on a beam response, a frequency modulation scheme may be used. However, this configuration is only one embodiment of the present disclosure, a signal modulation scheme is not limited to the frequency modulation scheme, and thus, use may be made of any modulation scheme which may be performed by using an analog component.

Hereinafter, a description will be made of a concept in which, according to an embodiment of the present disclosure, the receiver illustrated in FIG. 5 performs frequency modulations on respective multiple beam responses and then separates the respective beam responses from each other.

Consideration is given to a case where $$\begin{bmatrix} e^{j\pi} \\ e^{j2\pi} \\ e^{j\pi} \\ e^{j2\pi} \end{bmatrix} e^{j2\pi f_1 t}$$

representing a received signal is input to the four antenna elements 501-1 to 501-4. Here, p(t) represents an OFDM signal transmitted by the transmitter, and a reason for considering p(t) is because an embodiment of the present disclosure is on the premise of the transmission/reception of an OFDM signal as described above. Also, (1, 2, 3, 4) representing values, by which p(t) is multiplied, represent channel gain values. The OFDM signal p(t) is multiplied by the channel gain values while the OFDM signal p(t) passes through a channel, and values, which are obtained by multiplying the OFDM signal p(t) by the channel gain values, are input to the four antenna elements 501-1 to 501-4.

Also, consideration is given to a case where are used as beam weights of the first beam for the four respective antenna elements 501-1 to 501-4. In the beam weights of the first beam, f1 represents a modulation frequency for frequency-modulating a beam response. In this case, a beam response value of the first beam is expressed by Equation 3 below.

$$(1e^{j\pi}+2e^{j2\pi}+3e^{j\pi}+4e^{j2\pi})p(t)e^{j2\pi f_1 t}=2p(t)e^{j2\pi f_1 t} \quad \text{Equation 3}$$

Consideration is given to a case where $$\begin{bmatrix} e^{j\pi} \\ e^{j2\pi} \\ e^{j\pi} \\ e^{j2\pi} \end{bmatrix} e^{j2\pi f_2 t}$$

are used. f2 represents a modulation frequency for frequency-modulating a beam response. In this case, a beam response of the second beam is expressed by Equation 4 below.

$$(1e^{j2\pi}+2e^{j\pi}+3e^{j2\pi}+4e^{j\pi})p(t)e^{j2\pi f_2 t}=-2p(t)e^{j2\pi f_2 t} \quad \text{Equation 4}$$

Meanwhile, an output value from the reception unit 505 becomes equal to a value obtained by adding up Equation 3 and Equation 4, and the resultant value is expressed by Equation 5 below.

$$2p(t)e^{j2\pi f_1 t}-2p(t)e^{j2\pi f_2 t} \quad \text{Equation 5}$$

Equation 5 includes a signal component including the modulation frequency f1 and a signal component including the modulation frequency f2.

Accordingly, when a Fast Fourier Transform (FFT) is performed on the two signal components included in Equation 5 through digital signal processing, two spectrums of p(t) representing a transmitted signal appear with the frequencies f1 and f2 as start points.

Figure 6:
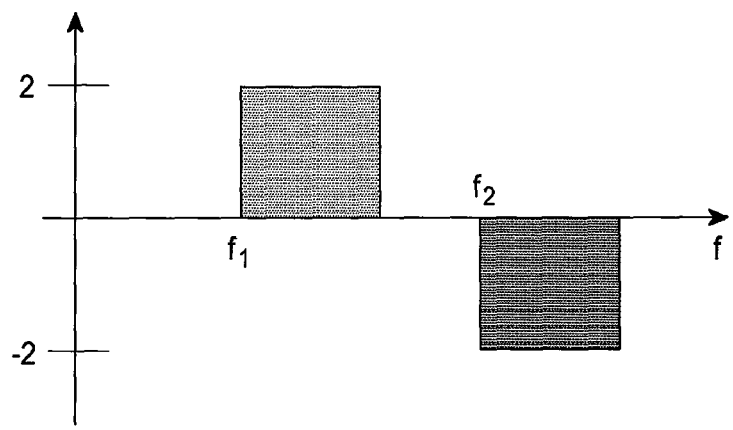
FIG. 6 is a view illustrating a frequency response after two beam responses are frequency-modulated at modulation frequencies f1 and f2 according to an embodiment of the present disclosure.

FIG. 6 is a view illustrating a frequency response after two beam responses are frequency-modulated at modulation frequencies f1 and f2 according to an embodiment of the present disclosure.

When consideration is given to a case where a frequency response signal in FIG. 6 does not include aliasing, signals with the frequencies f1 and f2 as start frequencies may be separated from the frequency response signal in FIG. 6 through a band-pass filter.

Figure 7:
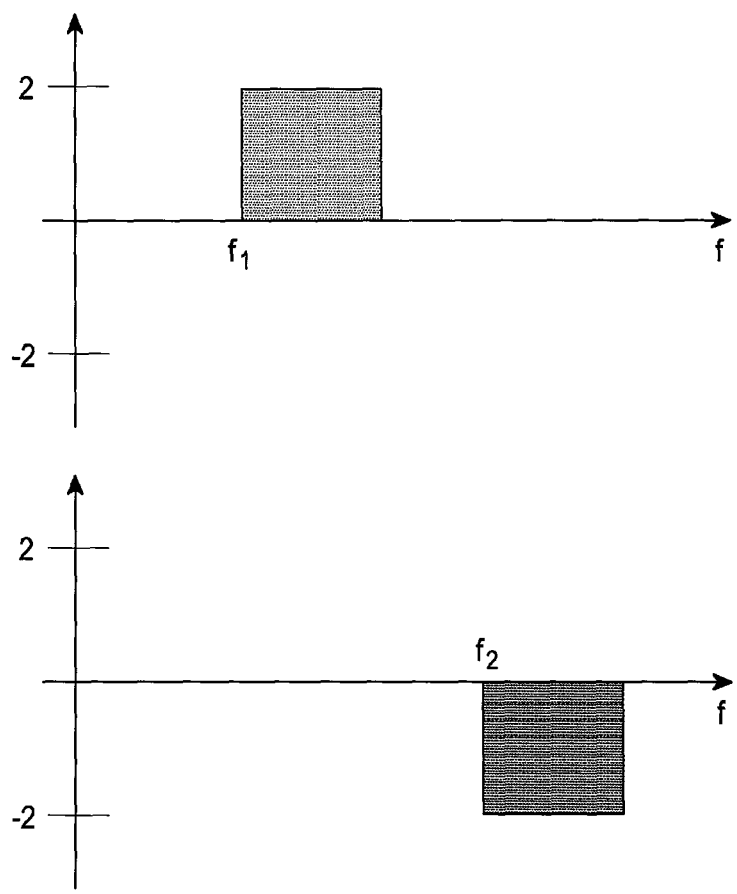
FIG. 7 is a view illustrating a result of filtering a frequency response signal, which has been frequency-modulated at f1 and f2, by using a band-pass filter according to an embodiment of the present disclosure.

FIG. 7 is a view illustrating a result of filtering a frequency response signal, which has been frequency-modulated at f1 and f2, by using a band-pass filter according to an embodiment of the present disclosure. In FIG. 7, it can be noted that the two signals pass through the band-pass filter and then are separated from each other as the respective signals with the frequencies f1 and f2 as start points.

Meanwhile, when the separated signals in FIG. 7 are respectively modulated at f1 and f2 corresponding to respective modulation frequencies, the original received signal may be reconstructed. At this time, the gain values, by which the original received signal has been multiplied, are responses of the first beam and the second beam. Accordingly, a beam response may be recognized through this process.

Hereinabove, it has been described that beam responses may be frequency-modulated and thereby may be separated from each other when the multiple beamformers share and use the one reception unit 505 as illustrated in FIG. 5.

Hereinafter, a description will be made of a configuration in which, according to an embodiment of the present disclosure, multiple beams are generated by using one beamformer and respective beam responses of the generated beams are frequency-modulated.

Figure 8:
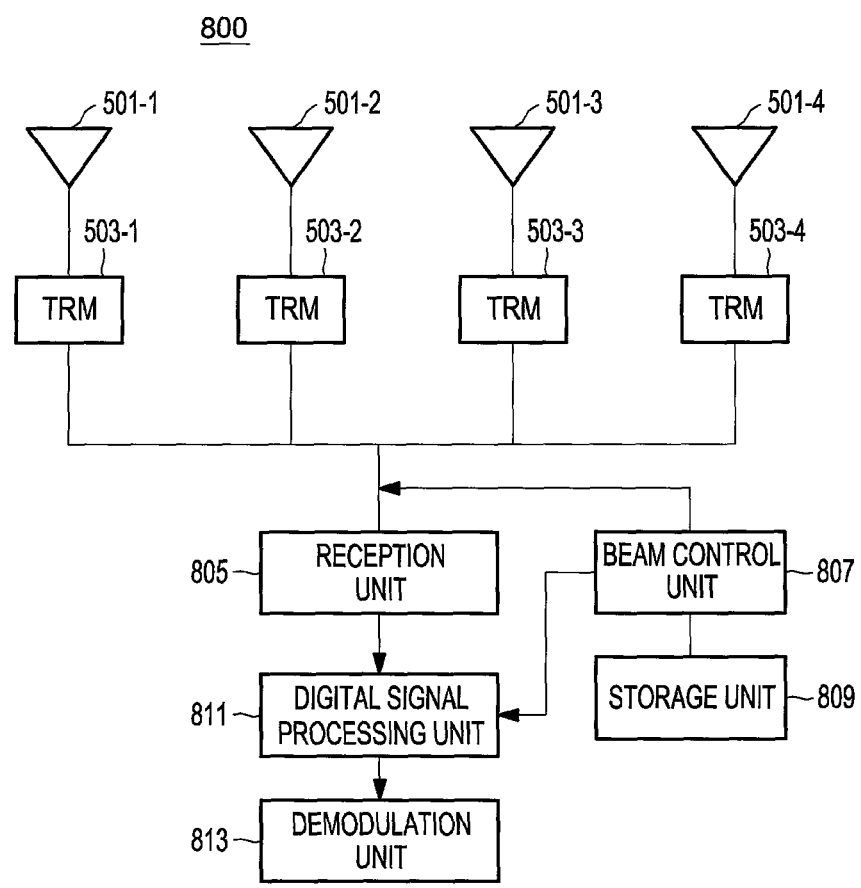
FIG. 8 is a view for explaining a receiver for generating multiple beams by using one beamformer according to an embodiment of the present disclosure.

FIG. 8 is a view for explaining a receiver for generating multiple beams by using one beamformer according to an embodiment of the present disclosure.

When compared with the receiver 500 in FIG. 5, the receiver 800 in FIG. 8 differs from the receiver 500 in that the receiver 800 includes only one beamformer. Specifically, four TRMs 503-1, 503-2, 503-3, and 503-4, and one reception unit 505 construct one beamformer. Also, the receiver 800 may include a beam control unit 807, and may further include a storage unit 809.

The beam control unit 807 determines pairs of {beam directions, modulation frequencies} for respective multiple beams in order to generate the multiple beams. At this time, when {beam directions, modulation frequencies} are determined, the beam control unit 807 determines pairs of beam directions and modulation frequencies which cause the sum of values, which are obtained by multiplying an M number of beams of an optional array antenna element by respective modulation frequencies, to become one of the complex gain values which may be obtained by the phase shifter and the attenuator as illustrated in FIG. 4.

Also, the reception unit 505 acquires beam responses of the multiple beams, and delivers the acquired beam responses to a digital signal processing unit 811.

The digital signal processing unit 811 receives information on {beam direction, modulation frequency} from the beam control unit 807, performs frequency modulation on the M number of beams by using the modulation frequencies according to the received information, and band-pass filters frequency-modulated beam responses. The frequency modulation and the band-pass filtering have been described with reference to FIGS. 6 and 7, and thus a detailed description thereof will be omitted.

A demodulation unit 813 may demodulate beam responses which are separated from each other after being band-pass filtered, and may acquire the separated beam responses.

Hereinafter, a description will be made of a process for determining pairs of beam directions and modulation frequency by the beam control unit 807. For convenience of description, a condition for causing the sum of values, which are obtained by multiply the M number of beams by modulation frequencies, to become a complex gain value in FIG. 4, will be referred to as a "complex gain value condition." The "complex gain value condition" includes a "phase condition" and a "magnitude condition," and a scheme for determining a pair of {beam direction, modulation frequency} satisfying these conditions will be described below.

Meanwhile, the number of pairs of {beam directions, modulation frequencies} satisfying the complex gain value condition may be plural for each direction of a beam. Accordingly, {beam directions, modulation frequencies} satisfying the complex gain value condition may be pre-stored in the storage unit 909 in the form of a table, and a pair of {beam direction, modulation frequency} to be used for multiple beams may be selected from the table. Specifically, when a particular direction is desired to be set for a beam, {beam direction, modulation frequency} corresponding to the relevant direction may be selected from the pre-stored table of {beam directions, modulation frequencies}.

Figure 9:
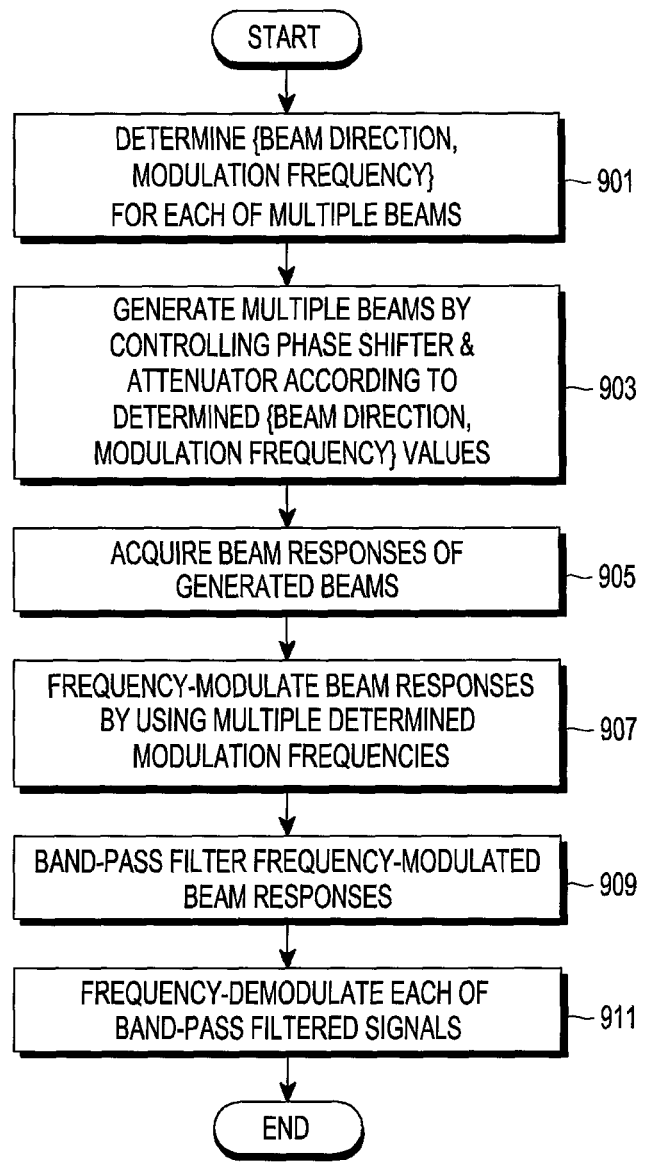
FIG. 9 is a view for explaining a method for generating multiple beams by using one beamformer and receiving a signal by using the multiple generated beams according to an embodiment of the present disclosure.

FIG. 9 is a view for explaining a method for generating multiple beams by using one beamformer and receiving a signal by using the multiple generated beams according to an embodiment of the present disclosure.

In step 901, the beam control unit 807 sets {beam direction, modulation frequency} for each of multiple beams. As described above, when {beam direction, modulation frequency} is set, {beam direction, modulation frequency} values may be pre-stored in the storage unit 809 in the form of a table, and one value may be selected from the values stored in the table.

In step 903, multiple beams are generated by controlling values of a phase shifter and an attenuator included in a TRM connected to each of the multiple beams, according to {beam direction, modulation frequency} values which are set for each of the multiple beams.

In step 905, the reception unit 505 acquires beam responses of the generated beams.

In step 907, the reception unit 505 frequency-modulates the acquired beam responses by using multiple modulation frequency values.

In step 909, each of the frequency-modulated beam responses is band-pass filtered. Accordingly, the responses of the respective beams may be separated from each other.

In step 911, multiple beam responses are acquired by frequency-demodulating the respective frequency-demodulated signals separated from each other through the band-pass filtering.

Meanwhile, among the steps illustrated in FIG. 9, the steps before step 905 are typically performed through analog signal processing, and the steps after step 905 are typically performed through digital signal processing. However, embodiments of the present disclosure are not limited thereto.

Hereinafter, a description will be made of a scheme for determining a pair of {beam direction, modulation frequency} satisfying the "complex gain value condition" by the beam control unit 807.

As described above with reference to FIG. 4, each of TRMs of a beamformer includes a phase shifter and an attenuator, and a beam gain value of a relevant antenna element is set by using the phase shifter and the attenuator. In this regard, complex gain values, which may be generated by using the phase shifter and the attenuator, are limited to the complex gain values illustrated in FIG. 4. The following description will be made of a process for finding a beam direction and a modulation frequency satisfying the complex gain value condition.

1. Setting of a Beam Direction and a Modulation Frequency—Step 901

A reason for setting a beam direction and a modulation frequency for each antenna element in step 901 is as described above. Specifically, when multiple beams are simultaneously generated by one analog beamformer and each of beam responses of the generated beams are frequency-modulated, the frequency-modulated beam responses are mathematically expressed as the sum of complex numbers changing according to time. As a result, this configuration causes the sum of complex numbers changing according to time to become one of the complex gain values illustrated in FIG. 4. When a direction and a modulation frequency of a particular beam, which cause the sum of the complex numbers to become one of the complex gain values illustrated in FIG. 4, are found, a result of simultaneously generating multiple beams by one beamformer is produced.

Hereinafter, a scheme for setting a direction and a modulation frequency of a beam will be described.

First, when a particular direction θ1 is desired to be set for a beam b1 with respect to all N antenna elements, complex gain values, which are set for antenna elements in TRMs of an analog beamformer, are expressed by Equation 6 below.

$$b_1 = [1, e^{jkd \sin \theta_1}, \ldots, e^{j(N-1)kd \sin \theta_1}]^T \quad \text{Equation 6}$$

Here, kd represents a value obtained by multiplying a wavelength by an interval between antenna elements, and is conventionally set to have a value of π.

Meanwhile, when the beam b1 is multiplied by an optional modulation frequency f1 which is set for frequency modulation, the beam b1 multiplied by the optional modulation frequency f1 is expressed by Equation 7 below.

$$b_1 e^{j2\pi f_1 t} = [1, e^{jkd \sin \theta_1}, \ldots, e^{j(N-1)kd \sin \theta_1}]^T e^{j2\pi f_1 t} \quad \text{Equation 7}$$

When an embodiment of the present disclosure considers a case where one analog beamformer simultaneously generates an M number of beams b1, b2, . . . , bM, if each of the generated M number of beams is frequency-modulated and then values obtained by frequency-modulating the respective beams are added together, the sum of the values is expressed by Equation 8 below. Here, consideration is given to a case where directions of the M number of beams are represented by θ1, θ2, . . . , θM, and modulation frequencies are represented by f1, f2, . . . , fM.

$$b(t) = b_1 e^{j2\pi f_1 t} + b_2 e^{j2\pi f_2 t} + \ldots + b_N e^{j2\pi f_N t} = \sum_{n=1}^{M} b_n e^{j2\pi f_n t} \quad \text{Equation 8}$$

When Equation 8 is multiplied by M representing the number of beams in order to normalize power, Equation 8 multiplied by M is expressed by Equation 9 below.

$$b(t) = \frac{1}{M} \sum_{n=1}^{M} b_n e^{j2\pi f_n t} \quad \text{Equation 9}$$

Meanwhile, when the M number of beams are set for the k-th antenna element, a complex gain, that a TRM connected to the k-th antenna element needs to represent, is expressed by Equation 10 below.

$$w_k(t) = \frac{1}{M} \sum_{n=1}^{M} e^{j(k-1)\pi \sin \theta_n} e^{j2\pi f_n t} \quad \text{Equation 10}$$

At this time, when a value calculated by Equation 10 becomes equal to one of the complex gain values illustrated in FIG. 4, an M number of beams may be generated by using one analog beamformer and a receiver. Specifically, in an embodiment of the present disclosure, an M number of beams are generated with respect to an N number of antenna elements by using a beamformer including one TRM and one reception unit.

In this regard, in a state where consideration is given to a case where multiple beams are generated by using such one beamformer, when beam directions θ1 to θM and modulation frequencies f1 to fM are capable of being calculated which generate a complex gain expressed by Equation 10 with respect to the k-th antenna element, as a result, this configuration can obtain an effect identical to that of simultaneously generating multiple beams having different directions θ1 to θM by using one beamformer. Specifically, one analog beamformer (one TRM+one reception unit) connected to the k-th antenna element implements $W_k(t)$.

Accordingly, in an embodiment of the present disclosure, consideration is given to a case where one analog beamformer connected to an N number of antenna elements simultaneously generates an M number of beams and each of the generated M number of beams is frequency-modulated. At this time, when beam directions and modulation frequencies are calculated which cause the sum of complex gain values of multiple beams of the k-th antenna element to become one of the complex gain values illustrated in FIG. 4, and when a phase shifter and an attenuator of a TRM are adjusted according to the calculated beam directions and modulation frequencies, an effect of simultaneously generating multiple beams by one TRM can be obtained.

Meanwhile, the complex gain values in FIG. 4 have phases which are all expressed by multiples of $2\pi \times (\frac{1}{2})^{Np}$. Accordingly, it corresponds to a phase condition of a complex gain value condition that phase parts of all complex number values in Equation 10 become multiples of $2\pi \times (\frac{1}{2})^{Np}$. Here, Np represents the number of bits that a phase shifter has.

However, it is difficult to accurately find mathematical regularity from magnitudes of the complex gain values in FIG. 4. Accordingly, in an embodiment of the present disclosure, a condition is set which causes magnitude parts of all the complex number values in Equation 10 to maximally approach those of the complex gain values in FIG. 4. This condition will be described below, and a conclusion thereof is that the magnitude parts of all the complex number values in Equation 10 become multiples of $2\pi \times (\frac{1}{2})^{Np}$. The conclusion corresponds to a magnitude condition of the complex gain value condition. Here, Np represents the number of bits that an attenuator has.

Hereinafter, the contents of Equation 10 will be described in detail on the basis of Equation 10.

It can be noted from Equation 10 that Equation 10 is a process for adding up complex numbers all having a magnitude of 1 N times and at this time, values of the respective complex numbers are changing according to time t. In this regard, when an actual system is implemented, values of complex numbers of Equation 10 are digitized by an Analog-to-Digital (A/D) converter. Accordingly, Equation 10 may be modified from the viewpoint of not t, which is a time-continuous signal, but a discrete signal, and beam directions and modulation frequencies may be found such that Equation 10 satisfies a condition illustrated in FIG. 4 with respect to the discrete signal.

For reference, when a complex number is expressed in Euler's form, a magnitude and a phase of the complex number may be represented, and Euler's form has a form expressed by Equation 11 below.

$$ae^{jb} \qquad \text{Equation 11}$$

a and b represent a magnitude and a phase of a complex number, respectively.

In an embodiment of the present disclosure, each of the complex number components of Equation 10 is converted to Euler's form, and the total sum of the complex number components converted to Euler's form is also configured to have Euler's form. Specifically, when Equation 10 is converted to one Euler's form, a phase part of the complex number converted to Euler's form corresponds to a phase, of which a phase shifter takes charge, and a magnitude part thereof corresponds to a magnitude, of which an attenuator takes charge.

Meanwhile, when Equation 10 is converted to an expression of a discontinuous signal, Equation 10 may be expressed by Equation 12 below.

$$w_k(l) = \frac{1}{M} \sum_{n=1}^{M} e^{j\{2\pi f_n T_s t + (k-1)\pi \sin\theta_n\}} \qquad \text{Equation 12}$$

Hereinafter, a description will be made of a process for calculating a beam direction and a modulation frequency by using Equation 12 which is a form in which a value, which is obtained by adding up an M number of beam responses of the k-th antenna element, is expressed as a discrete signal.

Equations 13 to 16 below describe a process for converting Equation 12 to Euler's form.

First, the sum of two complex numbers both having a magnitude of 1 may be expressed in Euler's form by Equation 13 below.

$$e^{jA} + e^{jB} = e^{jA}(1 + e^{j(B-A)}) \qquad \text{Equation 13}$$
$$= e^{jA} e^{j\frac{(B-A)}{2}} \left( e^{-j\frac{(B-A)}{2}} + e^{j\frac{(B-A)}{2}} \right)$$
$$= 2e^{j\frac{(A+B)}{2}} \cos\left(\frac{B-A}{2}\right)$$

When there are four complex numbers all having a magnitude of 1, the sum of the four complex numbers all having the magnitude of 1 may be expressed by Equation 14 below.

$$e^{jA} + e^{jB} + e^{jC} + e^{jD} = \qquad \text{Equation 14}$$
$$2e^{j\frac{(A+B)}{2}} \cos\left(\frac{B-A}{2}\right) + 2e^{j\frac{(C+D)}{2}} \cos\left(\frac{D-C}{2}\right)$$

In Equation 14, the four complex numbers in Euler's form are expressed by a sum of two components in subordinate Euler's form.

When there are a $2^N$ number of complex numbers all having a magnitude of 1, the sum of the $2^N$ number of complex numbers enables the acquisition of complex numbers in subordinate Euler's form which all have the form of Equation 15 below and are as many as $2^{(N-1)}$.

$$2e^{j\frac{(A+B)}{2}} \cos\left(\frac{B-A}{2}\right) \qquad \text{Equation 15}$$

Meanwhile, parts in subordinate Euler's form in Equation 15 may be grouped in one Euler's form by using a special condition. Here, the special condition causes the form of a final equation to become one Euler's form. Specifically, the form of a final equation is expressed by the multiplication of a phase part by a magnitude part, and a method for creating the special condition is as follows.

Consideration is given to a case where, in the sum of complex numbers which includes two components in subordinate Euler's form, magnitude parts of the two respective complex numbers in subordinate Euler's form are equal to each other, or phase parts of the two respective complex numbers in subordinate Euler's form are equal to each other. Accordingly, the two complex numbers in subordinate Euler's form are again reduced to a part in one subordinate Euler's form. When this process repeatedly performed, the complex numbers finally have one Euler's form. Therefore, a finally-obtained complex number has one Euler's form and only formulas remain which enable periodic functionization of a phase part and a magnitude part.

The above-described configuration will be described, as an example, in a case where two beams exist.

When two beams is considered, M=2 in Equation 12. Accordingly, Equation 12 becomes the sum of two complex numbers in Euler's form. When, in order to convert Equation 12 into a complex number in one Euler's form, phase values of the two respective complex numbers in Euler's form in Equation 12 are substituted into A and B in Equation 15 and the terms are rearranged, Equation 12 becomes Equation 16 below.

$$w_k(l) = e^{j\frac{\{2\pi f_1 T_s l + (k-1)\pi \sin\theta_n\} + \{2\pi f_2 T_s l + (k-1)\pi \sin\theta_n\}}{2}} \qquad \text{Equation 16}$$
$$\cos\frac{\{2\pi f_1 T_s l + (k-1)\pi \sin\theta_1\} - \{2\pi f_2 T_s l + (k-1)\pi \sin\theta_2\}}{2}$$

In Equation 16, a phase part is a phase of a TRM connected to a k-th antenna, of which a phase shifter needs to take charge, and a magnitude part is a magnitude of the TRM connected to the k-th antenna, of which an attenuator needs to take charge.

Hereinafter, the phase component in Equation 16 will be described with reference to Equations 17 to 23 below.

Only the phase component in Equation 16 is expressed by Equation 17 below.

$$\frac{2\pi f_1 T_s l + (k-1)\pi \sin\theta_1 + 2\pi f_2 T_s l + (k-1)\pi \sin\theta_2}{2} \qquad \text{Equation 17}$$

When Equation 17 is rearranged, rearranged Equation 17 becomes Equation 18 below.

$$\pi(f_1 + f_2)T_s l + \frac{(k-1)\pi(\sin\theta_1 + \sin\theta_2)}{2} \qquad \text{Equation 18}$$

As described above, in order to cause the sum of complex gain values of two beams of the k-th antenna element to become one of the complex gain values illustrated in FIG. 4, Equation 18 which is the phase component in Equation 16 needs to be expressed in terms of a multiple of $$2\pi \frac{1}{2^{N_p}}$$

which is phase values that the phase shifter of the TRM may express. Here, Np represents the number of bits of the phase shifter.

In order to cause the sum of the two components in Equation 18 to be expressed in terms of a multiple of $$2\pi \frac{1}{2^{N_p}},$$

each of $\pi(f_1+f_2)T_s l$, which is the first component in Equation 18, and $$\frac{(k-1)\pi(\sin\theta_1 + \sin\theta_2)}{2},$$

which is the second component in Equation 18, needs to be expressed in terms of a multiple of $$2\pi \frac{1}{2^{N_p}}.$$

When this configuration is mathematized, the mathematized configuration becomes Equations 19 and 20 below.

$$\pi(f_1+f_2)T_s l = 2\pi \frac{l_1}{2^{N_p}} \quad \text{Equation 19}$$

$$\frac{(k-1)\pi(\sin\theta_1 + \sin\theta_2)}{2} = 2\pi \frac{l_2}{2^{N_p}} \quad \text{Equation 20}$$

In Equations 19 and 20, $I_1$ and $I_2$ represent design parameters, and have integer values.

Meanwhile, when Equation 20 is rearranged with respect to frequencies f1 and f2, and directions sin θ1 and sin θ2, Equation 20 is expressed by Equation 21 below.

$$(f_1+f_2)l = 2\frac{l_1}{2^{N_p}}f_s \quad \text{Equation 21}$$

$$(k-1)(\sin\theta_1 + \sin\theta_2) = 4\frac{l_2}{2^{N_p}}$$

$$\text{Here, } f_s = \frac{1}{T_s}$$

Also, when I1 is set as a multiple of l in Equation 21, Equation 21 may be rearranged with respect to a new integer $\hat{I}_1$. Similarly, when I2 is set as a multiple of k−1 in Equation 21, Equation 21 may be rearranged with respect to a new integer $\hat{I}_2$. When rearranged as described above, Equation 21 is expressed by Equation 22 below.

$$f_1+f_2 = 2\frac{\hat{I}_1}{2^{N_p}}f_s \quad \text{Equation 22}$$

$$\sin\theta_1 + \sin\theta_2 = 4\frac{\hat{I}_2}{2^{N_p}}$$

According to the above-described process, in order to generate two beams by using one analog beamformer, Equation 22 becomes a phase condition which causes the sum of complex gain values of two beams of the k-th antenna element to become one of the complex gain values illustrated in FIG. 4.

Hereinafter, in relation to the magnitude in Equation 16, a magnitude condition of a complex gain value condition will be described with reference to Equations 23 to 29 below. The attenuator of the TRM takes charge of the magnitude part.

First, when only the magnitude part in Equation 16 is rewritten, the rewritten magnitude part in Equation 16 becomes Equation 23 below.

$$\cos\frac{\{2\pi f_1 T_s l + (k-1)\pi \sin\theta_1\} - \{2\pi f_2 T_s l + (k-1)\pi \sin\theta_2\}}{2} \quad \text{Equation 23}$$

Equation 23 has a structure having difficulty in causing Equation 23 to completely coincide with a grid that an attenuator typically used in a TRM has.

However, it is possible to cause an attenuation level value, which corresponds to a magnitude value of a complex gain value illustrated in FIG. 4, to be generated in even Equation 23. To this end, it is necessary to newly configure a distortion-type attenuator distorted by an existing attenuator, and to support the distortion-type attenuator.

In another scheme, it is necessary to find, from Equation 23, a value maximally approaching an attenuation level value which may be expressed by the existing attenuator. An embodiment of the present disclosure will use the latter scheme.

First, in Equation 23, changing integers are l and k, and internal components of a cosine function included in Equation 23 need to have periodic values, in order to cause the value of Equation 23 to become one of the magnitude values illustrated in FIG. 4 according to values of changing l and k. An embodiment of the present disclosure causes values, that the internal components of the cosine function have, to become multiples of $2\pi \times (\frac{1}{2})^{N_a}$ similarly to a value used for the above-described phase. Na represents the number of bits that the attenuator has.

When the internal components of the cosine function included in Equation 23 are rearranged, the rearranged internal components of the cosine function become Equation 24 below.

$$\frac{2\pi f_1 T_s l + (k-1)\pi \sin\theta_1 - 2\pi f_2 T_s l + (k-1)\pi \sin\theta_2}{2} \quad \text{Equation 24}$$

$$\pi(f_1-f_2)T_s l + \frac{(k-1)\pi(\sin\theta_1 - \sin\theta_2)}{2} \quad \text{Equation 25}$$

In a scheme similar to that of the case described above in Equation 18 related to the phase shifter, when the sum of two components in Equation 25 is desired to have a periodic value according to changing l and k, the first component and the second component in Equation 25 need to satisfy Equations 26 and 27 below, respectively.

$$\pi(f_1 - f_2)T_s l = 2\pi \frac{I_3}{2^{N_a}}$$ Equation 26

$$\frac{(k-1)\pi(\sin\theta_1 - \sin\theta_2)}{2} = 2\pi \frac{I_4}{2^{N_a}}$$ Equation 27

In respective Equations 26 and 27

$I_3$ and $I_4$ represent integer values, which are optional design parameters, and are experimentally determined.

Also, Na represents the number of bits that the attenuator may have.

Meanwhile, when Equation 27 is rearranged to obtain a formula depending on frequencies f1 and f2, and directions sin θ1 and sin θ2, Equation 28 below may be obtained.

$$(f_1 - f_2)l = 2\frac{I_3}{2^{N_a}}f_s$$ Equation 28

$$(k-1)(\sin\theta_1 + \sin\theta_2) = 4\frac{I_4}{2^{N_a}}$$

Here, when l3 is set as a multiple of 1, Equation 28 may be rearranged to obtain a formula depending on a new integer $\hat{I}_3$, and When l4 is set as a multiple of k−1, Equation 28 may be rearranged to obtain a formula depending on a new integer $\hat{I}_4$.

Accordingly, Equation 28 is expressed by Equation 29 below.

$$f_1 - f_2 = 2\frac{\hat{I}_3}{2^{N_a}}f_s$$ Equation 29

$$\sin\theta_1 + \sin\theta_2 = 4\frac{\hat{I}_4}{2^{N_a}}$$

According to the above-described process, in order to generate two beams by using one analog beamformer, Equation 29 becomes a magnitude condition which causes the sum of complex gain values of two beams of the k-th antenna element to become one of the complex gain values illustrated in FIG. 4.

To summarize the process described hereinabove is summarized, Equation 22 is a formula generated from the phase condition for generating two beams by using one analog beamformer, and Equation 29 is a formula generated from the magnitude condition. The two conditional formulas are both a linear equation depending on beam directions sin θ1 and sin θ2, and modulation frequencies f1 and f2, and $\hat{I}_1$, $\hat{I}_2$, $\hat{I}_3$, and $\hat{I}_4$ are design parameters and have experimentally-determined values. Accordingly, when optional values of $\hat{I}_1$, $\hat{I}_2$, $\hat{I}_3$, and $\hat{I}_4$ are substituted into the two conditional formulas and the four linear equations are solved, the value of a pair of beam directions sin θ1 and sin θ2, and modulation frequencies f1 and f2 may be calculated.

Specifically, when Equation 22, which is the above-described phase conditional formula related to the phase shifter, and Equation 29, which is the above-described magnitude conditional formula related to the attenuator, are added together, Equations 22 and 29 are rewritten as Equations 30 and 31 below, and the two formulas are expressed by linear equations, Equations 32 below may be obtained.

$$f_1 + f_2 = 2\frac{\hat{I}_1}{2^{N_p}}f_s$$ Equation 30

$$\sin\theta_1 + \sin\theta_2 = 4\frac{\hat{I}_2}{2^{N_p}}$$

$$f_1 - f_2 = 2\frac{\hat{I}_3}{2^{N_a}}f_s$$ Equation 31

$$\sin\theta_1 + \sin\theta_2 = 4\frac{\hat{I}_4}{2^{N_a}}$$

$$\begin{bmatrix}1 & 1\\1 & -1\end{bmatrix}\begin{bmatrix}f_1\\f_2\end{bmatrix} = \begin{bmatrix}2\frac{\hat{I}_1}{2^{N_a}}f_s\\2\frac{\hat{I}_3}{2^{N_a}}f_s\end{bmatrix}$$ Equation 32

$$\begin{bmatrix}1 & 1\\1 & -1\end{bmatrix}\begin{bmatrix}\sin\theta_1\\\sin\theta_2\end{bmatrix} = \begin{bmatrix}4\frac{\hat{I}_2}{2^{N_a}}\\4\frac{\hat{I}_4}{2^{N_a}}\end{bmatrix}$$

As described above, and $\hat{I}_1$, $\hat{I}_2$, $\hat{I}_3$, and $\hat{I}_4$ in Equation 32 are design parameters, and have optional values. Specifically, when optional values of $\hat{I}_1$, $\hat{I}_2$, $\hat{I}_3$, and $\hat{I}_4$ are experimentally substituted into Equation 32 and the equations are solved, the value of a pair of {beam directions θ1 and θ2, frequencies f1 and f2} is determined. At this time, optional values may be substituted into $\hat{I}_1$, $\hat{I}_2$, $\hat{I}_3$, and $\hat{I}_4$, and thus, the number of combinations of {beam directions θ1 and θ2, frequencies f1 and f2} is very large. Accordingly, multiple values of {beam directions θ1 and θ2, frequencies f1 and f2} may be pre-stored in the form of a table, and when a signal is desired to be received by using a beam, the signal may be received after acquiring, from the stored table, a pair of a beam direction and a modulation frequency corresponding to the number of required beams.

For example, multiple values of {beam directions θ1 and θ2, frequencies f1 and f2} may be stored in the form of a table in a format shown in Table 1 below.

TABLE 1

| Beam direction | Modulation frequency |
|---|---|
| {θ1, θ2} | {f1, f5}, {f3, f7}, {f2, f7}, {f6, f11}, {f2, f5}, {f4, f3} |
| {θ3, θ4} | {f5, f15}, {f6, f8}, {f8, f4}, {f3, f2}, {f7, f1}, {f4, f1}, {f10, f2}, {f3, f1},{f5, f6}, {f3, f8}, {f8, f1} |
| . | . |
| . | . |
| . | . |

Table 1 is an example for helping understanding. Specifically, when $\hat{I}_1$, $\hat{I}_2$, $\hat{I}_3$, and $\hat{I}_4$ are substituted into Equation 31, a solution of a pair of {beam directions θ1 and θ2, frequencies f1 and f2} is determined, and corresponding pairs of modulation frequencies may be calculated with respect to a pair of two beam directions as shown in Table 1 from solutions of multiple linear equations. Also, as shown in Table 1 where modulation frequency pairs are exemplified as a total of six pairs with respect to a beam direction pair {θ1, θ2}, and modulation frequency pairs are exemplified as a total of eleven pairs with respect to a beam direction pair {θ3, θ4}, it goes without saying that corresponding modulation frequency pairs may be different in the number thereof with respect to a beam direction pair.

After storing the table, for example, Table 1, with respect to {beam directions θ1 and θ2, frequencies f1 and f2} as described above, if there is a beam direction pair desired when a signal is received, when values of one frequency pair is selected from among values of frequency pairs corresponding to the relevant beam direction pair and a phase value and a magnitude value of a TRM are adjusted according to the beam direction pair and the frequency pair, a result of simultaneously generating multiple beams by using one analog beamformer may be produced.

Hereinabove, a case has been described as an example where the number of beams is equal to 2. Hereinafter, a case has been described as an example in which the number of beams is equal to 4.

A basic scheme is identical to that of the case where the number of beams is equal to 2. Specifically, when four beams are used for an N number of antenna elements, a complex gain of an optional k-th antenna element is expressed in Euler's form, and a pair of a direction and a modulation frequency is found which correspond to conditions which cause a phase part and a magnitude part of a complex gain value expressed in Euler's form to be respectively expressed as one phase value and one magnitude value from among the phase values and the magnitude values of the complex gain values illustrated in FIG. 4.

A scheme in the case where the number of beams is equal to 4 is basically identical to that of the above-described case where the number of beams is equal to 2. Accordingly, an embodiment in the case where the number of beams is equal to 4 will be briefly described.

First, when four complex numbers expressed in Euler's form is expressed by the sum of two complex numbers expressed in Euler's form, the four complex numbers expressed in Euler's form is expressed by Equation 33 below.

$$e^{jA} + e^{jB} + e^{jC} + e^{jD} = \qquad \text{Equation 33}$$
$$2e^{j\frac{(A+B)}{2}}\cos\left(\frac{B-A}{2}\right) + 2e^{j\frac{(C+D)}{2}}\cos\left(\frac{D-C}{2}\right)$$

There are two methods for obtaining a complex number in one Euler's form from a complex number including the two complex numbers expressed in Euler's form in Equation 33.

A first scheme is to consider phase parts of the two respective complex numbers in Euler's form are equal to each other. A second scheme is to consider magnitude parts of the two respective complex numbers in Euler's form are equal to each other.

First, when consideration is given to a case where the phase parts are equal to each other according to the first scheme, a conditional formula in Equation 34 below may be obtained.

$$A+B=C+D \qquad \text{Equation 34}$$

According to Equation 34, Euler's form in Equation 35 below may be obtained from Equation 33.

$$e^{jA} + e^{jB} + e^{jC} + e^{jD} = \qquad \text{Equation 35}$$

-continued
$$2e^{j\frac{(A+B)}{2}}\cos\left(\frac{B-A}{2}\right) + 2e^{j\frac{(C+D)}{2}}\cos\left(\frac{D-C}{2}\right) =$$
$$2e^{j\frac{(A+B)}{2}}\left(\cos\left(\frac{B-A}{2}\right) + \cos\left(\frac{D-C}{2}\right)\right)$$

For convenience, a description will be made without substituting actual complex number values into A, B, C, and D. In Equation 35, $$e^{j\frac{(A+B)}{2}}$$

is a part, of which a phase shifter needs to take charge, and $$\cos\left(\frac{B-A}{2}\right) + \cos\left(\frac{D-C}{2}\right)$$

is a part, of which an attenuator needs to take charge.

Also, since the sum of the two cosine functions needs to be in a limited range, when an equation is obtained which sets component values of the two cosine functions so as to enable the sum of the two cosine functions to be in a limited range, a linear equation may be obtained as in the case of two beams. Thereafter, design parameters may be appropriately configured and a modulation frequency and a beam direction may be calculated. Hereinabove, the consideration that the phase parts are equal to each other has been described.

According to the second scheme, when consideration is given to a case where magnitude parts of the two respective complex numbers in Equation 32 are equal to each other, a conditional formula in Equation 35 below may be obtained.

$$B-A=D-C \qquad \text{Equation 36}$$

According to Equation 36, Equation 35 may be expressed in Euler's form in Equation 37 below.

$$e^{jA} + e^{jB} + e^{jC} + e^{jD} = \qquad \text{Equation 37}$$
$$2e^{j\frac{(A+B)}{2}}\cos\left(\frac{B-A}{2}\right) + 2e^{j\frac{(C+D)}{2}}\cos\left(\frac{D-C}{2}\right) =$$
$$2\cos\left(\frac{B-A}{2}\right)\left(e^{j\frac{(A+B)}{2}} + e^{j\frac{(C+D)}{2}}\right) =$$
$$4\cos\left(\frac{B-A}{2}\right)\cos\left(\frac{C+D-A-B}{4}\right)e^{j\frac{(A+B+C+D)}{4}}$$

In Equation 37, $$e^{j\frac{(A+B+C+D)}{4}}$$

which is a phase part is a part, of which a phase shifter needs to take charge. An equation including an optional setting parameter may be obtained in a scheme identical to that of the embodiment in which two beams are considered.

Meanwhile, in Equation 37, $$\cos\left(\frac{B-A}{2}\right) + \cos\left(\frac{C+D-A-B}{4}\right)$$

is a part, of which an attenuator needs to take charge. An equation including an optional setting parameter may be obtained in a scheme identical to that of the embodiment in which two beams are considered. Thereafter, in order to cause the multiplication of the two cosine functions to become one of the values illustrated in FIG. 4, an equation for setting component values of the two cosine functions is obtained.

Meanwhile, even in a case where the number of beams is equal to 2L (L represents a natural number equal to 3 or more), which is further extended from the case where the number of beams is equal to 4, a modulation frequency and a beam direction of each beam may be acquired in the identical scheme.

2. Generation of an M Number of Beams and Execution of Frequency Modulation on Each Beam, by a Phase Shifter and an Attenuator—Steps 903 and 905

When {(beam direction pair), (modulation frequency pair)} is determined or is selected (from the table) as described above, a signal received by using the relevant {(beam direction pair), (modulation frequency pair)} is delivered from the beam control unit 807 to the phase shifter and the attenuator of the TRM. Thereafter, the phase shifter and the attenuator continuously change respective bits according to sampling time, and perform beam steering and frequency modulation on a response of each beam according to a change in time.

When two beams are considered, in Equation 10, beam directions θ1 and θ2, and modulation frequencies f1 and f2 are predetermined and become fixed values, and k is also a fixed value. Accordingly, in Equation 10, only time t is a variable and t changes in a unit of is representing a bit sampling time period, and thus an overall complex gain value also changes. Therefore, in order to implement W(k), the phase shifter and the attenuator also need to switch respective bits according to the sampling time period. A reason for this configuration is because W(k) may become one of the complex gain values illustrated in FIG. 4.

As compared with the existing scheme, in the existing scheme, a TRM uses a fixed complex gain value, and thus, bits of a phase shifter and an attenuator do not have to be switched according to a sampling time period. However, in an embodiment of the present disclosure, multiple beams are simultaneously generated by one analog beamformer. When beam directions θ1 and θ2, and modulation frequencies f1 and f2 are determined according to the above-described scheme, the determination of beam directions θ1 and θ2, and modulation frequencies f1 and f2 implies that W(k) in Equation 10 is changed to one of the complex gain values in FIG. 4 according to time. Accordingly, in an embodiment of the present disclosure, an overall complex gain value according to multiple beams of a k-th antenna element varies according to time, and thus, bits of the phase shifter and the attenuator need to be changed according to the time-varying complex gain value.

3. Separation of Responses of Respective Beams from Each Other Through a Band-Pass Filter—Step 909

Output signals digitized by the receiver may be separated from each other through the band-pass filter. The separation of the output signals from each other through the band-pass filter is as described with reference to FIG. 6.

4. Demodulation of a Frequency Modulation Signal for Each of the Separated Signals—Step 911

Frequency modulation causes each of the responses of the respective beams, which are separated from each other through the band-pass filter, to be in a state of being multiplied by an $e^{j2\pi ft}$ part. Accordingly, when each of the responses of the respective beams is again multiplied by an $e^{-j2\pi ft}$ part and is demodulated, the responses of the respective beams may be obtained.

Hereinabove, embodiments of the present disclosure have been described in detail. In embodiments of the present disclosure, in order to steer multiple beam directions and simultaneously acquire multiple beam responses by using one beamformer and one receiver, a complex gain value forming a beam during transmission/reception of a signal may be changed by using a time-varying beam weight and responses of respective beams may be frequency-modulated, thereby causing an output from the one receiver to move to a particular frequency band, and the responses of the respective beams may be separated from each other through a process for digital processing of a signal. Accordingly, manufacturing costs of user equipments can be reduced, and Digital Signal Processing (DSP) on multiple beam responses may be performed and adaptive processing may be performed by using the execution of the DSP on the multiple beam responses, so that a time period required to find an optimal beam can be reduced.

Also, embodiments of the present disclosure can be applied to various fields in which multiple beam responses are received and utilized. For example, embodiments of the present disclosure may be applied to a WiGig-dedicated terminal using a beam as a medium, so that a time period required for beam sweeping can be reduced. Also, in the case of a radar, embodiments of the present disclosure may be introduced to a monopulse antenna tracking the direction of a target, so that the degree of freedom of adaptive processing can be increased. Further, embodiments of the present disclosure may be applied to a user equipment using BDMA belonging to the next-generation communication technology, and when compared with a user equipment having one Radio Frequency (RF) chain, the former has many advantages.

Further, an optimal beam can be more rapidly found and a time period required to select an optimal beam can be reduced during a handover between base stations. Therefore, a process for a search for a neighboring base station and handover initiation, and a network re-entry process can be rapidly performed, so that a seamless handover can be implemented.

Those skilled in the art can appreciate that it is possible to implement the present disclosure in another specific form without changing the technical idea or the indispensable characteristics of the present disclosure. Accordingly, it should be understood that the embodiments described above are merely exemplary and are not limited. Although exemplary embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments based on the technical idea of the present disclosure besides the embodiments disclosed herein can be carried out.

What is claimed is:

1. A method for receiving a signal by using an M number of beams in a multi-antenna system including an N number of antenna elements, the method comprising:
   determining, by a beam controller, beam directions and modulation frequencies for frequency-modulating beam responses to generate the M number of beams;

generating, by a beamformer, the M number of beams according to the beam directions and the modulation frequencies;

generating, by a receiver, an M number of beam responses to a signal received by the M number of generated beams;

frequency-modulating, by a processor, the generated M number of beam responses using the modulation frequencies that are set according to the M number of beams;

band-pass filtering an, by the processor, M number of frequency-modulated beam responses and separating the M number of beam responses from each other; and demodulating, by a demodulator, each of the separated M number of beam responses.

2. The method as claimed in claim 1, further comprising: determining, by the beam controller, pairs of beam directions and modulation frequencies that cause a sum of values obtained by multiplying the M number of beams, wherein the pairs of beam directions and modulation frequencies are set for a k-th antenna element, by the modulation frequencies, and set according to the M number of beams, to become one of complex gain values capable of being expressed by a transmit/receive module (TRM) connected to the k-th antenna element; and selecting, by the beam controller, the beam directions and the modulation frequencies that are set according to the M number of beams, from among the determined pairs of the beam directions and the modulation frequencies.

3. The method as claimed in claim 2, further comprising storing the determined pairs of the beam directions and the modulation frequencies in a table form.

4. The method as claimed in claim 2, further comprising: converting, by the beam controller, a sum of values, set according to the M number of beams, obtained by multiplying the M number of beams by the modulation frequencies into a complex number having a magnitude and a phase; and determining, by the beam controller, the pairs of beam directions and the modulation frequencies that cause the converted phase to become a multiple of a phase value capable of being expressed by a phase shifter within the TRM and cause the converted magnitude to become a multiple of a magnitude value capable of being expressed by an attenuator within the TRM.

5. The method as claimed in claim 4, wherein the phase value capable of being expressed by the phase shifter corresponds to $2\pi \times (\frac{1}{2})Np$, wherein Np represents a number of bits of the phase shifter.

6. The method as claimed in claim 4, wherein the phase value capable of being expressed by the attenuator corresponds to $2\pi \times (\frac{1}{2})Na$, wherein Na represents a number of bits of the phase shifter.

7. The method as claimed in claim 1, wherein a sum of values, set according to the M number of beams, obtained by multiplying the M number of beams by the modulation frequencies, corresponding to a value changing according to time.

8. An apparatus for receiving a signal by using an M number of beams in a multi-antenna system including an N number of antenna elements, the apparatus comprising:

a beam controller configured to determine beam directions and modulation frequencies for frequency-modulating beam responses to generate the M number of beams;

a beamformer configured to generate the M number of beams according to the beam directions and the modulation frequencies;

a receiver configured to generate an M number of beam responses to a signal received by the M number of generated beams;

a digital signal processor configured to:
frequency modulate the generated M number of beam responses using the modulation frequencies that are set according to the M number of beams; and
band-pass filter an M number of frequency-modulated beam responses and separates the M number of beam responses from each other; and a demodulator configured to demodulate each of the separated M number of separated beam responses.

9. The apparatus as claimed in claim 8, wherein the beam controller is further configured to:
determine pairs of beam directions and modulation frequencies that cause a sum of values obtained by multiplying the M number of beams, wherein the pairs of beam direction and modulation frequencies are set for a k-th antenna element, by the modulation frequencies, and set according to the M number of beams, to become one of complex gain values capable of being expressed by a transmit/receive module (TRM) connected to the k-th antenna element; and
select the beam directions and the modulation frequencies that are set according to the M number of beams, from among the determined pairs of the beam directions and the modulation frequencies.

10. The apparatus as claimed in claim 9, wherein the beam controller is further configured to:
convert a sum of values, set according to the M number of beams, obtained by multiplying the M number of beams by the modulation frequencies into a complex number having a magnitude and a phase; and
determine pairs of the beam directions and the modulation frequencies that cause the converted phase to become a multiple of a phase value capable of being expressed by a phase shifter within the TRM and cause the converted magnitude to become a multiple of a magnitude value capable of being expressed by an attenuator within the TRM.

11. The apparatus as claimed in claim 10, wherein the phase value capable of being expressed by the phase shifter corresponds to $2\pi \times (\frac{1}{2})Np$, wherein Np represents a number of bits of the phase shifter.

12. The apparatus as claimed in claim 10, wherein the phase value capable of being expressed by the attenuator corresponds to $2\pi \times (\frac{1}{2})Na$, wherein Na represents a number of bits of the phase shifter.

13. The apparatus as claimed in claim 10, further comprising a storage that stores the determined pairs of the beam directions and the modulation frequencies in a table form.

14. The apparatus as claimed in claim 8, wherein a sum of values, set according to the M number of beams, obtained by multiplying the M number of beams by the modulation frequencies, corresponding to a value changing according to time.

* * * * *